US007837754B2

(12) United States Patent
Johnson et al.

(10) Patent No.: US 7,837,754 B2
(45) Date of Patent: Nov. 23, 2010

(54) MULTI-ELEMENT FILTER ARRANGEMENT AND METHODS

(75) Inventors: Philip Edward Johnson, Apple Valley, MN (US); David Meline Webb, New Prague, MN (US); Paul Stewart Booth, Burnsville, MN (US); David E. Carlson, Burnsville, MN (US)

(73) Assignee: Donaldson Company, Inc., Minneapolis, MN (US)

(*) Notice: Subject to any disclaimer, the term of this patent is extended or adjusted under 35 U.S.C. 154(b) by 0 days.

(21) Appl. No.: 12/547,079

(22) Filed: Aug. 25, 2009
(Under 37 CFR 1.47)

(65) Prior Publication Data
US 2010/0006514 A1    Jan. 14, 2010

Related U.S. Application Data

(62) Division of application No. 11/278,153, filed on Mar. 31, 2006, now Pat. No. 7,597,734.

(60) Provisional application No. 60/668,894, filed on Apr. 5, 2005.

(51) Int. Cl.
*B01D 46/00* (2006.01)
(52) U.S. Cl. .............................. 55/482; 55/498; 55/486; 55/495; 55/499; 55/500; 55/502; 55/510; 55/511; 95/273
(58) Field of Classification Search ................... 55/498, 55/495, 499, 500–502, 510–511, 482, 485; 210/338, 450, 451, 321.6, 171, 416.4, 235, 210/266, 206, 254, 256, 258, 416.1, 456
See application file for complete search history.

(56) References Cited

U.S. PATENT DOCUMENTS 2,864,505 A    12/1958   Kasten
2,929,506 A     3/1960   Belgarde (Continued)

FOREIGN PATENT DOCUMENTS

| DE | 3046179 A-1 | 7/1982 |
|---|---|---|
| EP | 0424933 A2 | 5/1991 |
| GB | 1280357 | 7/1972 |
| WO | WO 2006/091557 A2 | 8/2006 |

OTHER PUBLICATIONS

International Search Report, mailed Aug. 25, 2006.

*Primary Examiner*—Jason M Greene
*Assistant Examiner*—Dung Bui
(74) *Attorney, Agent, or Firm*—Merchant & Gould P.C.

(57) ABSTRACT

A filter element includes a first, outer tubular construction of filter media defining a first open filter interior; a second, inner tuber construction of filter media defining a second open filter interior; the second construction of filter media being located within the first open filter interior and being radially spaced from the first construction of filter media; and the second open filter interior defines an unfiltered fluid channel. A plastic inner liner is within the first open filter interior to support the first construction of filter media. A plastic outer liner is within the first open filter interior to support the second construction of filter media. A filtered fluid channel is defined between the inner liner and the outer liner. A brace arrangement is between the first and second tubular constructions. The brace arrangement can include a spring, a plurality of gussets, or a solid spacer.

7 Claims, 8 Drawing Sheets

U.S. PATENT DOCUMENTS

| | | |
|---|---|---|
| 3,228,527 A | 1/1966 | McPherson |
| 3,388,802 A | 6/1968 | Wilkinson |
| 3,494,114 A * | 2/1970 | Nelson et al. ............... 55/482 |
| 4,482,367 A * | 11/1984 | Howeth .................. 55/304 |
| 4,487,227 A | 12/1984 | Meissner |
| 4,537,681 A | 8/1985 | Argiropoulos et al. |
| 4,592,838 A | 6/1986 | Christophe et al. |
| 4,634,458 A * | 1/1987 | Craig ......................... 96/136 |
| 5,152,890 A * | 10/1992 | Linnersten ............... 210/315 |
| 5,490,930 A * | 2/1996 | Krull ......................... 210/443 |
| 5,928,512 A * | 7/1999 | Hatch et al. ............... 210/266 |
| 6,068,762 A | 5/2000 | Stone et al. |
| 6,139,725 A | 10/2000 | Barr et al. |
| 6,478,958 B1 * | 11/2002 | Beard et al. ............ 210/323.2 |
| 6,602,308 B1 * | 8/2003 | Carle et al. ............... 55/385.3 |
| 6,652,614 B2 * | 11/2003 | Gieseke et al. ............ 55/498 |
| 6,800,200 B2 | 10/2004 | Bassett et al. |
| 6,863,758 B1 | 3/2005 | Altmeyer et al. |
| 6,984,319 B2 * | 1/2006 | Merritt et al. ............... 210/209 |
| 7,001,517 B2 * | 2/2006 | Gershenson ............... 210/342 |
| 7,597,734 B2 | 10/2009 | Johnson et al. |
| 2002/0073665 A1 * | 6/2002 | Gieseke et al. ............ 55/482 |
| 2003/0226793 A1 * | 12/2003 | Merritt et al. ............... 210/206 |
| 2004/0118092 A1 * | 6/2004 | Tran et al. .................... 55/423 |
| 2005/0056582 A1 | 3/2005 | Patel et al. |
| 2006/0113233 A1 * | 6/2006 | Merritt et al. ............... 210/206 |
| 2006/0186031 A1 | 8/2006 | Fick et al. |
| 2006/0191832 A1 | 8/2006 | Richie et al. |
| 2006/0191836 A1 | 8/2006 | Dworatzek et al. |
| 2006/0191839 A1 | 8/2006 | Howard et al. |

* cited by examiner

MULTI-ELEMENT FILTER ARRANGEMENT AND METHODS

CROSS-REFERENCE TO RELATED APPLICATIONS

This application is a divisional of U.S. patent application Ser. No. 11/278,153, filed Mar. 31, 2006 now U.S. Pat. No. 7,597,734, and this application claims priority to U.S. provisional patent application Ser. No. 60/668,894, filed Apr. 5, 2005. The complete disclosure of application Ser. No. 11/278,153 and Ser. No. 60/668,894 is incorporated herein by reference.

TECHNICAL FIELD

This application relates to filters. In particular, this application describes filters useable for filtering fluids in a multi-pass application to achieve cleanliness of the fluids while maintaining a high flow rate.

BACKGROUND

Standard filters have only a single media pack filtering in one direction only. These types of arrangements require the media pack to be supported against collapse in high pressure drop conditions. In these types of applications, the efficiency cannot be increased without a degradation in flow rate or increase in pressure drop. An increase in efficiency also causes the dirt holding capacity to decrease. In many applications, the media is within a steel can, which contaminates the steel for scrap and causes customers to get less than premium value for the scrap metal.

Improvements are desirable.

SUMMARY

A filter element is provided including a first, outer tubular construction of filter media defining a first open filter interior; a second, inner tuber construction of filter media defining a second open filter interior; the second construction of filter media being located within the first open filter interior and being radially spaced from the first construction of filter media; and the second open filter interior defines an unfiltered fluid channel. A plastic inner liner is within the first open filter interior to support the first construction of filter media. A plastic outer liner is within the first open filter interior to support the second construction of filter media. A filtered fluid channel is defined between the inner liner and the outer liner. A brace arrangement is between the first construction of filter media and the second construction of filter media.

A method of filtering is provided including directing unfiltered fluid through a first tubular construction of media and into a filtered fluid volume; directing unfiltered fluid through a second tubular construction of media and into the filtered fluid volume, the second tubular construction of media being circumscribed by and radially spaced from the first tubular construction of media; and supporting the first tubular construction of media and the second tubular construction of media with a non-metallic brace arrangement between the first tubular construction of media and the second tubular construction of media.

A method of constructing a filter element is provided. The method includes selecting a first filter media and forming the first filter media into a tubular construction having a non-metallic inner liner; selecting a second filter media and forming the second filter media into a second tubular construction having a non-metallic outer liner; operably orienting the second tubular construction in the first tubular construction and radially spacing the first filter media from the second filter media; and providing a non-metallic brace construction between the first tubular construction and the second tubular construction.

DETAILED DESCRIPTION

Figure 1:
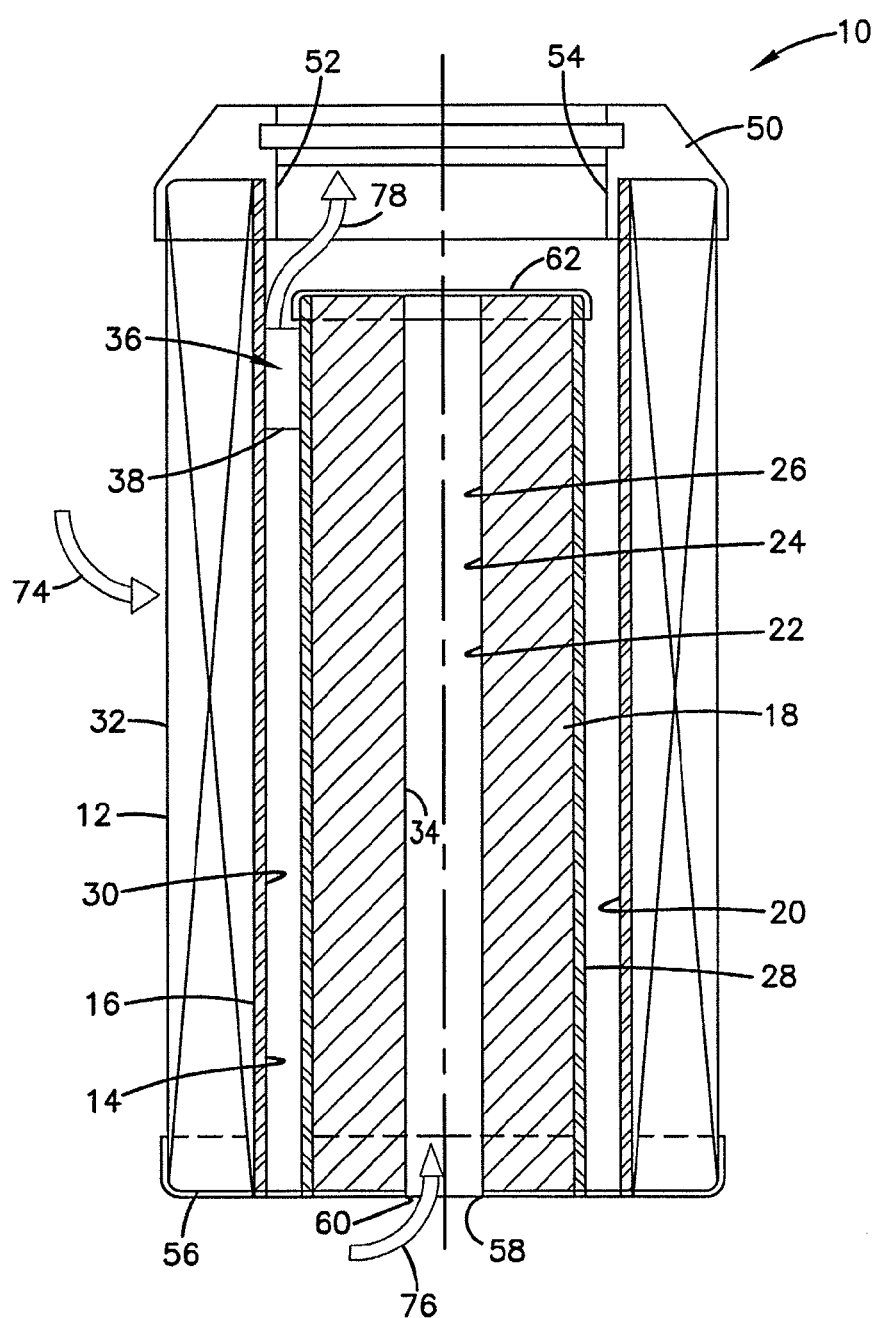
FIG. 1 is a cross-sectional view of a filter element constructed according to principles of this disclosure.

In reference to FIG. 1, one embodiment of a multi-element filter element is depicted generally at 10. The filter element can be used in a multi-pass system, utilizing two different filter medias to filter fluid from a common reservoir. In these types of systems, the overall filtration efficiency of the filter element 10 will approach that of the higher efficiency filter media as time progresses. Thus, even a small side stream of fluid through higher efficiency media will be of benefit to the overall system performance. In addition, two medias of varying efficiency and pressure drop fed from a common source will self-balance with respect to individual flow through each. Further, two filter medias, having internal and external support and a common flow path therebetween, can act to structurally support one another.

In FIG. 1, the filter element 10 includes a first, outer tubular construction of filter media 12. The first outer tubular construction of filter media 12 is shown cylindrical, but can be other shapes, including conical. The first construction of filter media defines a first open filter interior 14. Lining the first open filter interior 14 is an inner liner 16, which functions to provide support to the first construction of filter media 12. The inner liner 16 is porous or perforated to allow for the flow of fluid through the first media construction 12 and then through the inner liner 16 to the open filter interior 14.

In preferred arrangements, the inner liner 16 will be non-metallic. In many preferred arrangements, the inner liner 16 will be made from plastic. The construction of the filter element 10, as described below, results in materials for the inner liner 16 that are relatively thin, lightweight, and inexpensive, when compared to conventional, metallic liners. In preferred arrangements, the inner liner has a thickness not greater than 0.1 in. In one arrangement, the thickness of the inner liner 16 will be about 0.090-0.099 in.

The first outer construction of filter media 12 can be many different types of media. For example, the media 12 can be pleated media, non-pleated media, synthetic, paper, etc. Of course, the type of media 12 used will depend upon the application.

In the embodiment shown, the filter element 10 further includes a second, inner tubular construction of filter media 18. The tubular construction of media 18 is depicted as cylindrical, but can be other shapes, including conical. In the embodiment shown, the second construction of filter media 18 is located within the first open filter interior 14. Preferably, the second construction of filter media 18 is radially spaced from the first construction of filter media 12 to define a fluid channel 20 between the outer media 14 and inner media 18. The media 18 can be many types of filter media, including pleated, non-pleated, synthetic, paper, etc.

The second inner tubular construction of filter media 18 defines a second open filter interior 22. The second open filter interior 22 defines a fluid channel 24 therewithin. In preferred embodiments, the fluid channel 24 is an unfiltered fluid channel 26.

Supporting the second construction of filter media 18 is an outer liner 28. The outer liner 28 is porous or perforated to allow for the flow of fluid therethrough. Preferably, the outer liner 28 is non-metallic. Preferably, the outer liner 28 is constructed of plastic having a thickness not greater than 0.1 in. In one preferred arrangement, the outer liner 28 has a thickness between 0.090 and 0.099 in.

The fluid channel 20 between the outer filter media 14 and inner filter media 18 is also located between the inner liner 16 and outer liner 28. Preferably, the fluid channel 20 is a filtered fluid channel 30. That is, in operation, preferably fluid to be filtered flows through an upstream side 32 of the first filter media 12, through the media 12, and through the inner liner 16 to reach the filtered fluid channel 30, while unfiltered fluid flows into the unfiltered fluid channel 26, through the upstream side 34 of the inner filter media 18, through the media 18, through the outer liner 28, and into the filtered fluid channel 30. The fluid in the filtered fluid channel 30 then exits the filter element 10 to be used within the system.

In order to balance the filter element 10, a brace arrangement 36 is provided. In the embodiment shown, the brace arrangement is provided between the first tubular construction of filter media 12 and the second tubular construction of filter media 18. In the specific embodiment of FIG. 1, the brace arrangement 36 is between and against the inner liner 16 and the outer liner 28. The brace arrangement 36, in this embodiment, is an incompressible solid spacer 38 between the inner liner 16 and outer liner 28 to ensure that the pressures across the outer media 12 and inner media 18 are balanced. In this embodiment, the brace arrangement 36 is constructed of non-metallic material, such as plastic. Because of the existence of the brace arrangement 36, the inner liner 16 and outer liner 28 can be made of relatively thin, lightweight, plastic material when compared to prior art core arrangements that require metal or very thick non-metal liners to withstand the pressure differential.

Figure 3:
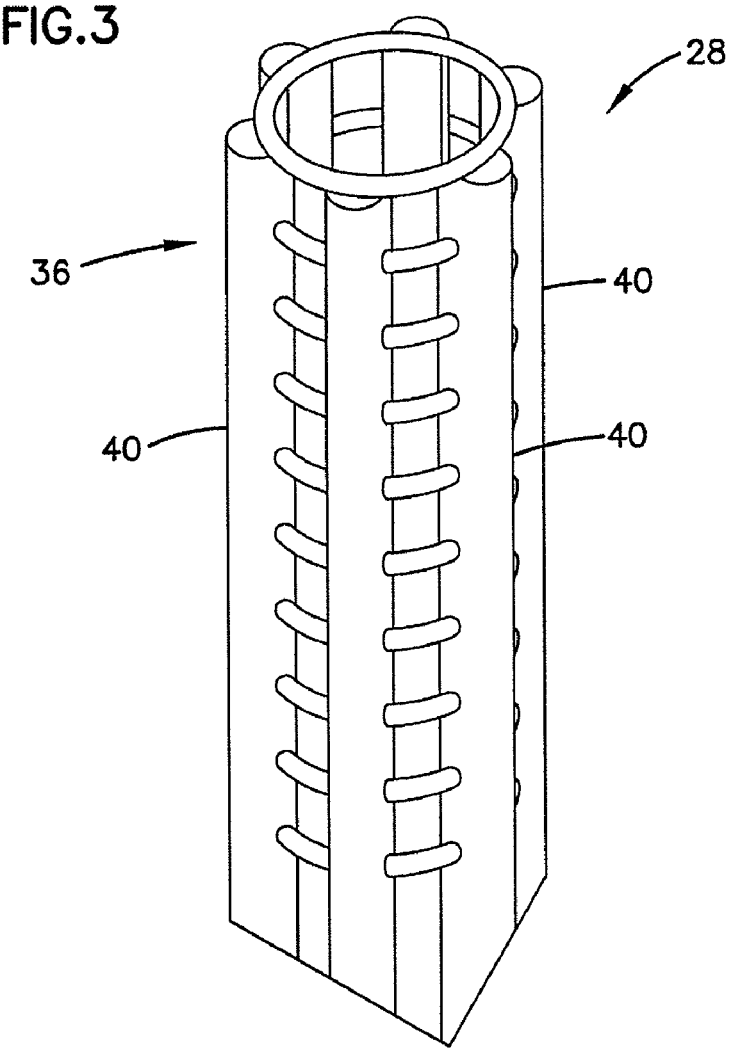
FIG. 3 is a fragmented, perspective view of an outer liner useable with the filter element of FIGS. 1 and 2.
Figure 4:
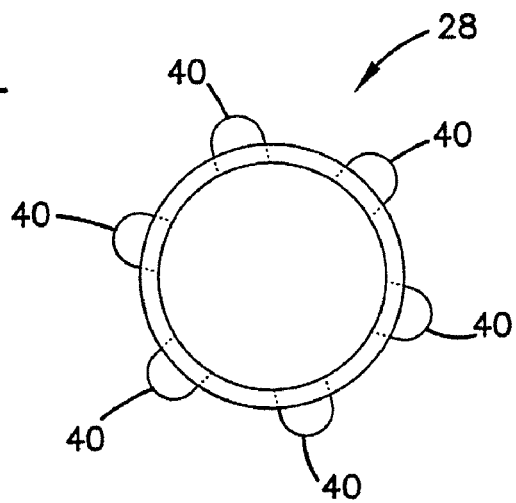
FIG. 4 is an end view of the outer liner of FIG. 3.

In reference now to FIGS. 3 and 4, one embodiment of the brace arrangement 36 is depicted as including at least one rib 40 radially extending between and against the inner liner 16 and the outer liner 28. In the particular embodiment shown, the brace arrangement 36 includes a plurality of ribs 40 extending between and against the inner liner 16 and outer liner 28. hi the embodiment depicted, the outer liner 28 has the ribs 40 extending longitudinally along the length of the outer liner 28 to radially protrude from the outer liner 28 and against the inner liner 16. In the example embodiment shown, there are at least three ribs 40, for example 4-10 ribs 40. Each of the ribs 40 radially protrudes at least 0.2 in., typically 0.25-1.25 in., for example about 0.3-0.5 in.

Other embodiments of the brace arrangement 36 are useable. The brace arrangement 36 can be, for example, a spring. This embodiment is described in connection with FIGS. 6-9, described below. The ribs 40 can have many different cross-sections including square, rectangular, polygon, oval, irregular, etc.

In reference again to FIG. 1, in the arrangement shown, the filter element 10 further includes a first open end cap 50. The end cap 50 defines an opening or aperture 52. In typical operation, the aperture 52 will function as an outlet aperture 54.

In the embodiment shown, the filter element 10 further includes a second end cap 56 defining an opening or aperture 58. In typical operation, the aperture 58 will be an inlet aperture 60.

In the arrangement shown, the first construction of filter media 12 extends between the first end cap 50 and the second end cap 56. The media 12 can be secured to the end cap 50 and end cap 56 through many different techniques including, for example, potting or molding.

In the embodiment shown, the second construction of filter media 18 is secured to the second end cap 56. In this way, the second end cap 56, in the embodiment shown, commonly secures both the first media construction and the second media construction 18. The second filter media 18 can be secured to the second end cap 56 through many different techniques including, for example, potting or molding.

Still in reference to FIG. 1, in the embodiment of the filter element 10 shown, there is a third end cap 62. The third end cap 62 is depicted as a closed end cap, meaning that it defines no flow apertures therethrough. The embodiment depicted shows the second construction of media 18 extending between and being secured to the second end cap 56 and the third end cap 62. Again, the second filter media 18 may be secured to the third end cap 62 through a variety of techniques including, for example, potting or molding.

In the embodiment shown, the third end cap 62 is axially spaced from the first end cap 50. This axial spacing helps to define a flow path from the filtered fluid channel 30 to the outlet aperture 54. The outlet aperture 54 is in communication with the fluid flow channel 30 to allow filtered fluid to exit the filter element 10 from the filtered fluid channel 30 through the outlet aperture 54. The inlet aperture 60 is in communication with the unfiltered fluid channel 26.

In operation, fluid to be filtered flows through either the outer media 12 or the inner media 18. When flowing through the outer media 12, the fluid flows in a standard, forward flow direction, from outside of the media 12 to the open filter interior 14, shown at arrow 74. The fluid is filtered by the media 12 and reaches the filtered fluid channel 30. When the unfiltered fluid flows through the inner filter media 18, shown at arrow 76, it flows through the inlet aperture 60, into the unfiltered fluid channel 26, through the inner region of filter media 18, and then joins the other filtered fluid in the filtered fluid channel 30. The inner filter media 18 operates as a reverse-flow element, with fluid flowing from the open filter interior 22, through the media 18, and to the outside of the second filter media 18. While the filter is operating, the brace arrangement 36 helps to hold or support the inner liner 16 against the outer liner 28 and prevent both the outer filter media 12 and the inner filter media 18 from collapsing. The filtered fluid, shown at arrow 78, then exits the filter element 10 through the outlet aperture 54.

Figure 2:
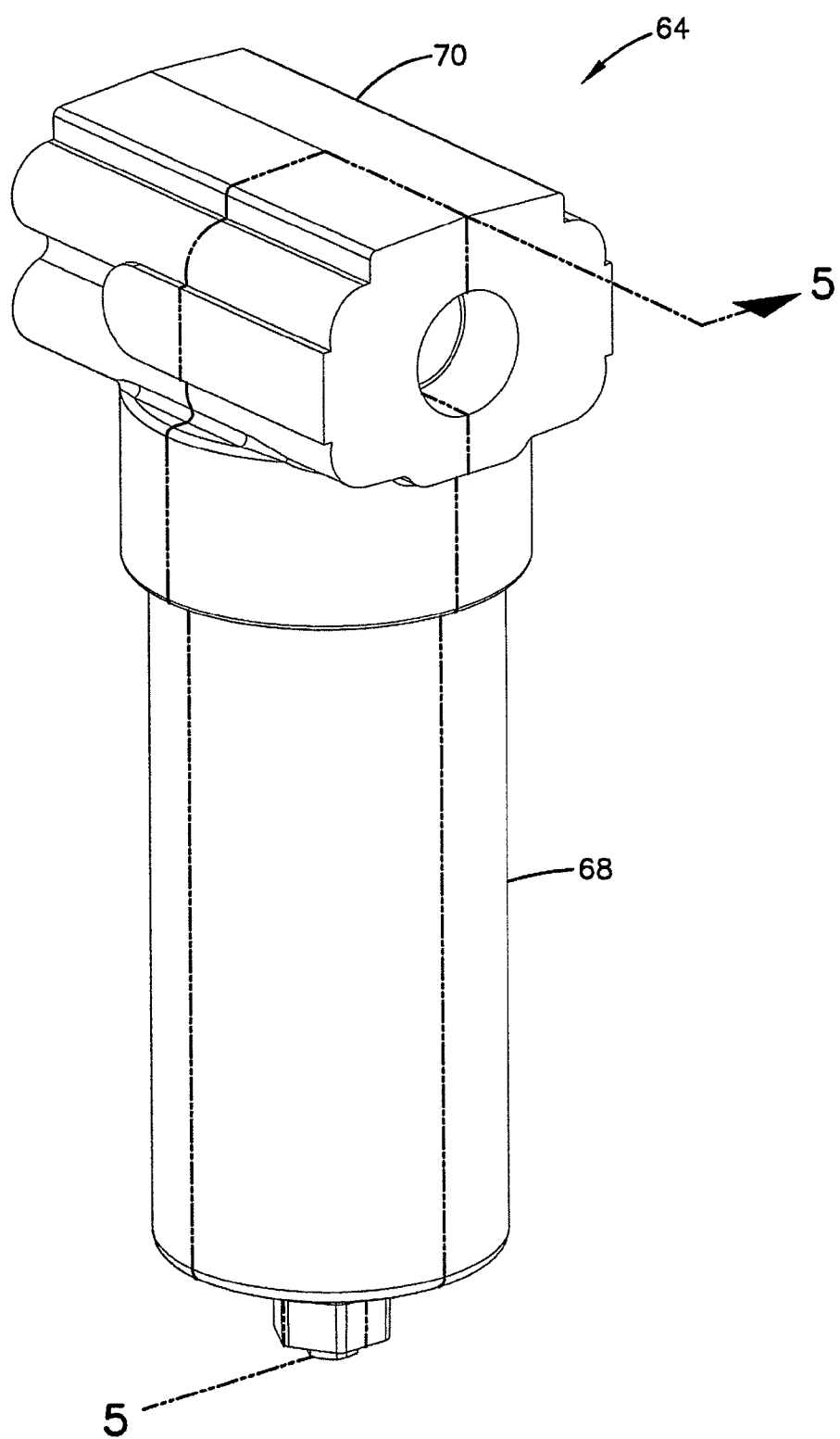
FIG. 2 is a perspective view of a filter assembly including a housing with the filter element of FIG. 1 operably installed therein.
Figure 5:
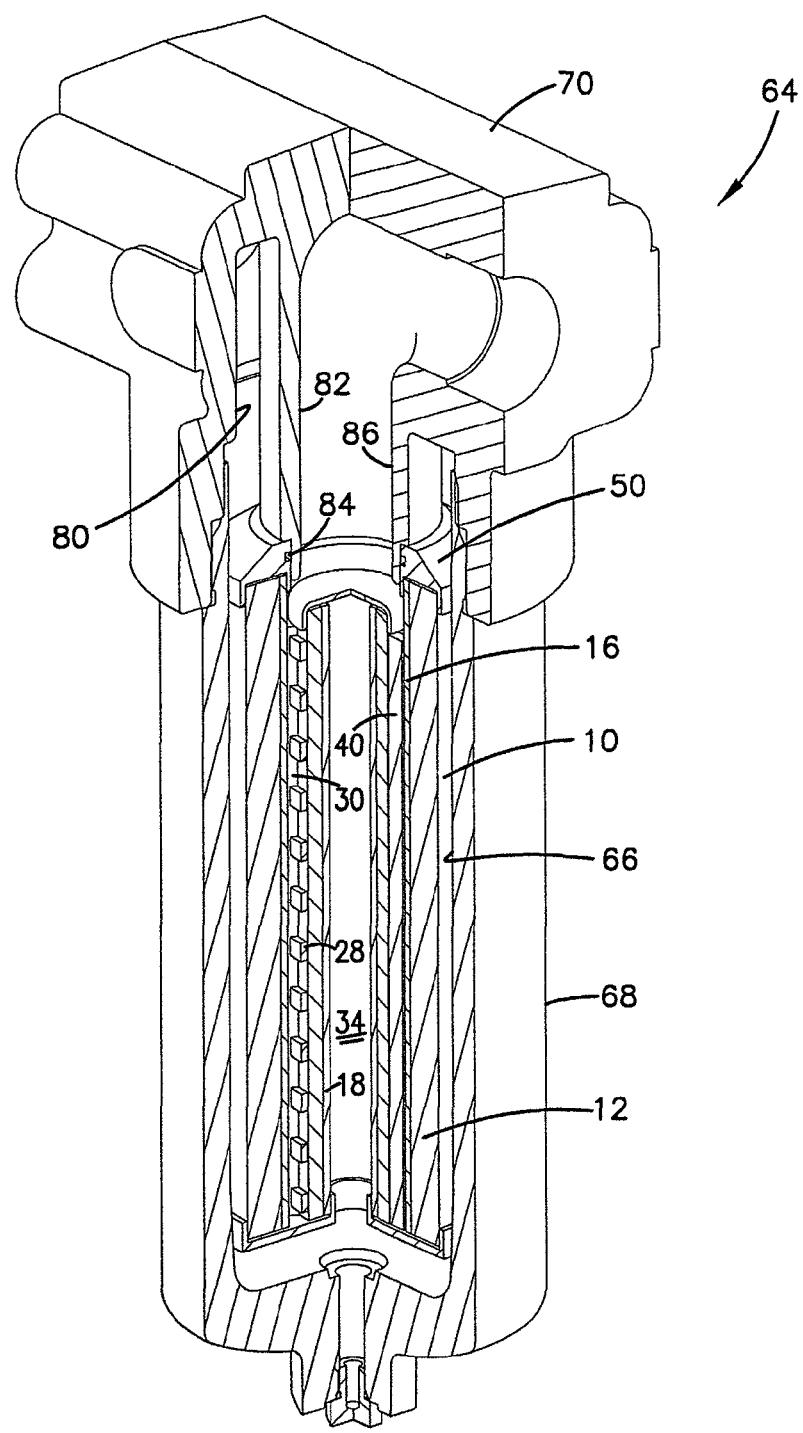
FIG. 5 is a perspective, cross-sectional view of the filter assembly of FIG. 2; the cross-section being taken along the line 5-5 of FIG. 2.

In reference now to FIGS. 2 and 5, a filter assembly is depicted at 64. The filter assembly 64 includes the filter element 10 operably oriented within an interior 66 of a housing 68. In preferred arrangements, the filter element 10 is removable and replaceable within the housing 68. The filter assembly 64 is operably mounted on a filter head 70. The filter head 70 includes an inlet channel 80 to allow for the flow of unfiltered fluid therein and to the filter element 10. The filter head 70 also includes an outlet channel 82, which allows for the flow of filtered fluid from the filtered fluid channel 30. In the arrangement shown, a seal 84 is formed between a spud 86 on the filter head 70 and the first open end cap 50 of the element 10. In some arrangements, the filter assembly 64 is threadably attached to the head 70.

Preferably, the filter element 10 is constructed entirely of materials that make it environmentally friendly. For example, the filter element 10 is constructed of at least 98% non-metallic material, preferably at least 99%, and more preferably 100% non-metallic material. When constructed of at least 98% non-metallic material, the filter element 10 is readily incineratable.

Filter elements constructed according to principles of this disclosure can operate at a wide range of overall flow while allowing the different filter media to self-balance their flow rates with respect to one another. In addition, many different combinations of filter media can be easily and readily created due to the separate constructions of the outer media 12 and inner media 18.

A method of constructing a filter element can be practiced according to principles of this disclosure. For example, first, a first filter media is selected and formed into the first tubular construction of media 12. The first tubular construction of filter media 12 is provided with the inner liner 16, preferably, a non-metallic inner liner 16. Next, a second filter media is selected and formed into the second tubular construction 18 having an outer liner 28, preferably a non-metallic outer liner 28. Next, the second tubular construction 18 is operably oriented in the first tubular construction 12. The first construction of filter media 12 is arranged relative to the second construction of media 18 so that they are radially spaced from one another to result in fluid channel 20 therebetween. Next, the brace arrangement 36 is provided between and against the inner liner 16 and the outer liner 28. Preferably, this brace arrangement 36 is non-metallic.

The method of constructing a filter element further includes securing the first tubular construction of media 12 between the first open end cap 50 and the second open end cap 56. The method preferably includes securing the second filter media construction 18 to the second open end cap 56 and securing an opposite end of the filter media 18 to a third end cap 62.

Figure 6:
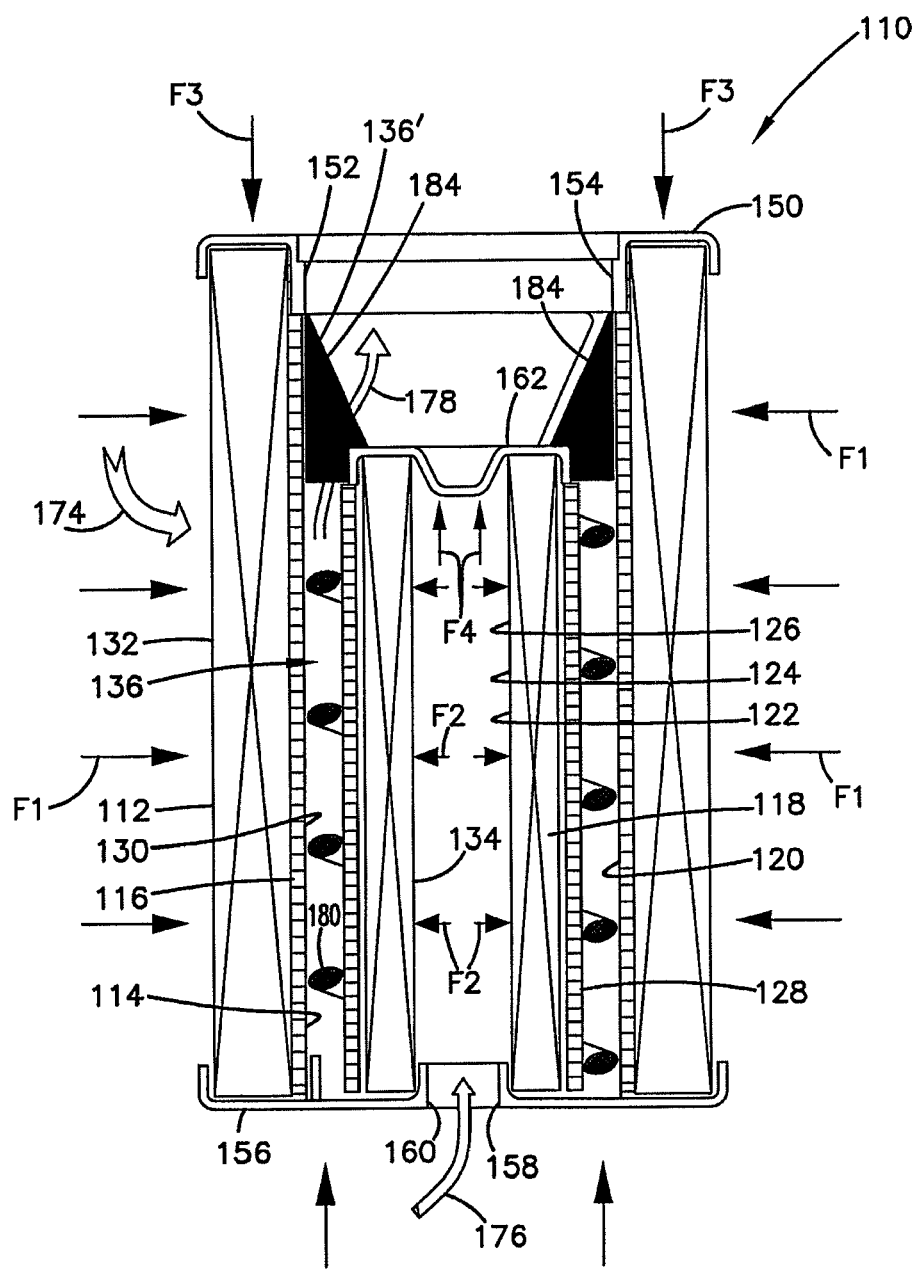
FIG. 6 is a cross-sectional view of a second embodiment of a filter element constructed according to principles of this disclosure.

Attention is next directed to the embodiment of FIG. 6. FIG. 6 depicts a cross-sectional view of a filter element 110 that is similar in many respects to the filter element described above in FIG. 1. To the extent the components are the same, the filter element 110 of FIG. 6 will carry the same reference numeral as FIG. 1, but with 100 being added to the number to depict a second embodiment. The description of the components of FIG. 1 apply to the description of FIG. 6 and are incorporated herein by reference. In general, the filter element 110 of FIG. 6 includes a first, outer tubular construction of filter media 112; a first open interior 114; an inner liner 116; a second, inner tubular construction of filter media 118; a fluid channel 120; a second open filter interior 122; a fluid channel 124; an unfiltered fluid channel 126; an outer liner 128; a filtered fluid channel 130; an upstream side 132; an upstream side 134; a brace arrangement 136; a first open end cap 150; an aperture or opening 152; an outlet aperture 154; a second end cap 156 defining an opening or aperture 158; an inlet aperture 160; and a third end cap 162. Although not depicted in a separate drawing, the filter element 110 is operably positionable within a housing, such as housing 68 depicted in FIG. 2 to form filter assembly 64.

Figure 9:
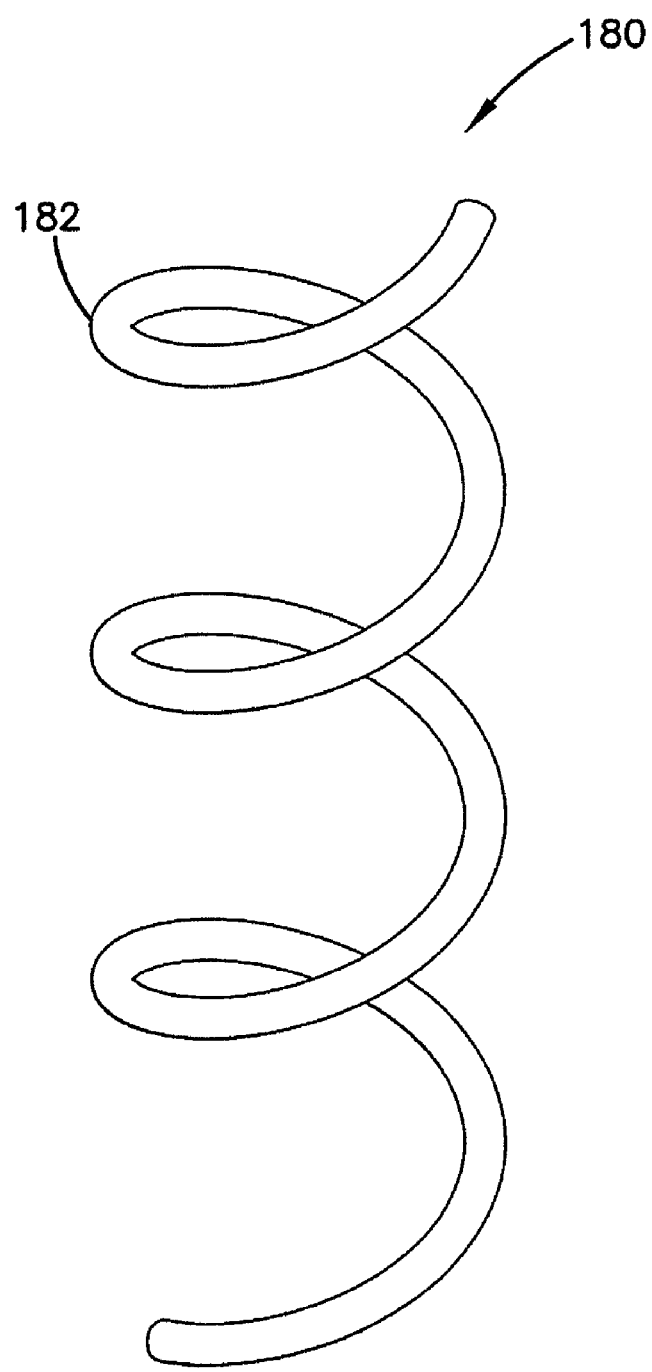
FIG. 9 is a perspective view of a component useable in the filter element of FIGS. 6-8.

In the embodiment of FIG. 6, the brace arrangement 136 is embodied as a spring 180. FIG. 9 depicts one embodiment of spring 180 that is useable in the arrangement. In FIG. 9, the spring 180 is shown as a coiled spring 182. Preferably, the coiled spring 182 comprises non-metallic material, such as plastic. The embodiment shown in FIG. 9 illustrates three coils, but more or fewer coils could be used, depending upon the size of the filter element 110.

FIG. 6 also illustrates brace arrangement 136'. Brace arrangement 136' can be used in addition to the brace arrangement 136 (embodied in FIG. 6 as spring 180), or it can be used independently and alone (that is, without the brace arrangement 136). In the embodiment shown in FIG. 6, the brace arrangement 136' includes a plurality of gussets 184. In the embodiment shown, the gussets 184 act as structural braces extending between the first open end cap 150 and the third open end cap 162.

In the embodiment of FIG. 6, the coiled support, or spring 180, provides separation of the first tubular construction of filter media 112 and the second tubular construction of filter media 118. As flow and pressure or dirt loading increases, the forces push the media constructions 112, 118 and their respective support tubes 128, 116 towards each other. This force puts the coiled support or spring 180 in compression on its outside surfaces. The forces are shown at arrows F1 and F2. The coiled support 180 aids in withstanding these forces to a very high level under a variety of conditions.

The brace arrangement 136' helps to sustain opposing forces F3 (acting on the first open end cap 150) and forces F4 (action on the third end cap 162). Specifically, forces on the outer portion of the first open end cap 150 are compressing the end cap 150 inward and towards the media 112. Forces F4 on the inner portion of third end cap 162 are pushing the cap 162 outward and away from second filter media 118. By connecting the end cap 150 to the end cap 162 with gussets 184, the forces F3 and F4 negate each other and provide a stable design. This stability is helpful to prevent catastrophic failure that could occur if the third end cap 162 were forced off of the second media construction 118 and entered the clean flow stream 178.

Figure 7:
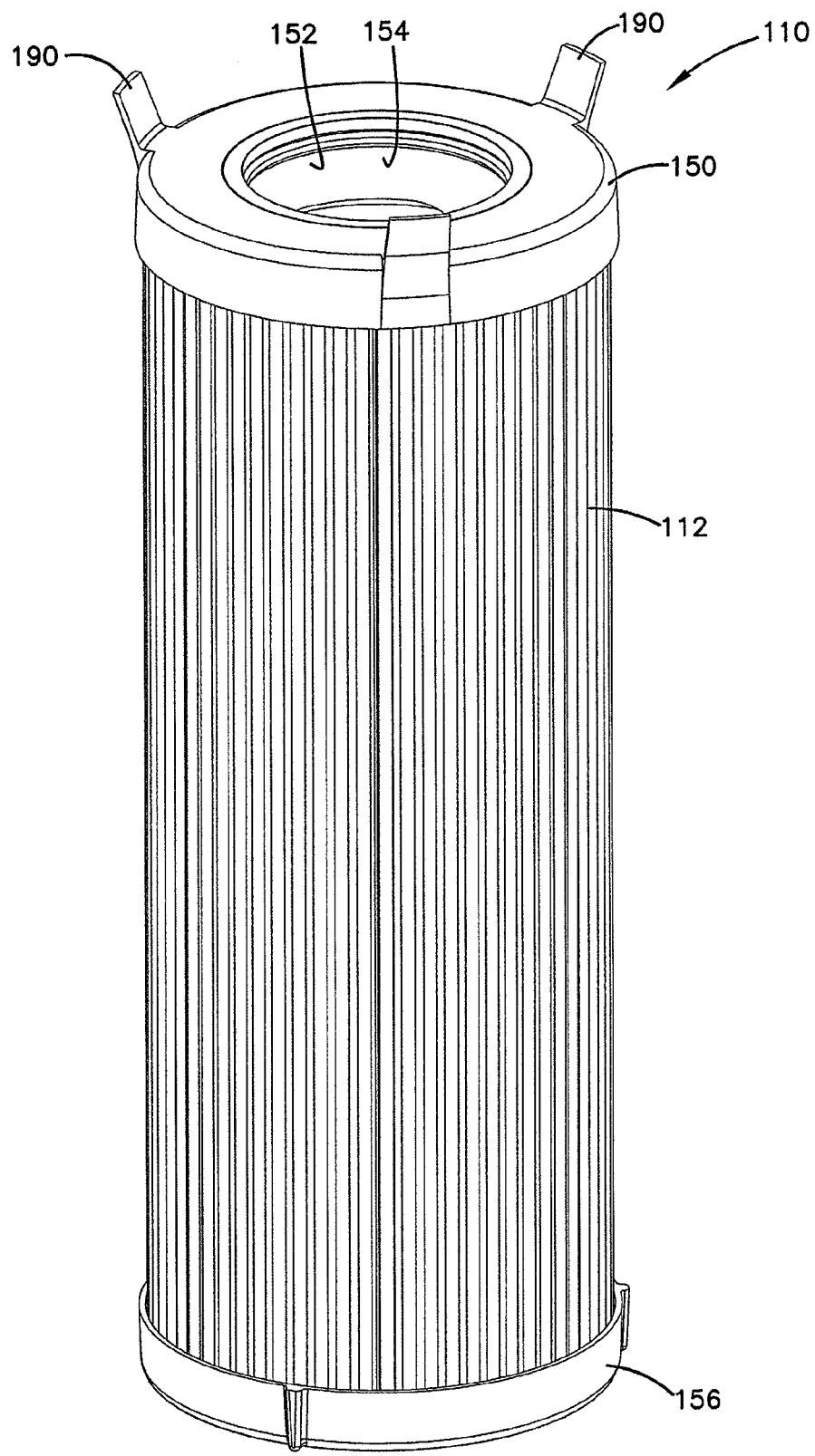
FIG. 7 is a perspective view of the filter element depicted in FIG. 6.

FIG. 7 is a perspective view of the filter element 110 depicted in FIG. 6. In FIG. 7, certain other useable features are visible. In particular, flexible ears or tabs 190 can be seen extending from the outermost periphery of the first open end cap 150. The tabs 190 can be used to space the element 110 from the inner wall of the housing, as shown in Patent Publication WO 2004/033067. The complete disclosure of Patent Publication WO 2004/033067 is incorporated herein by reference.

Figure 8:
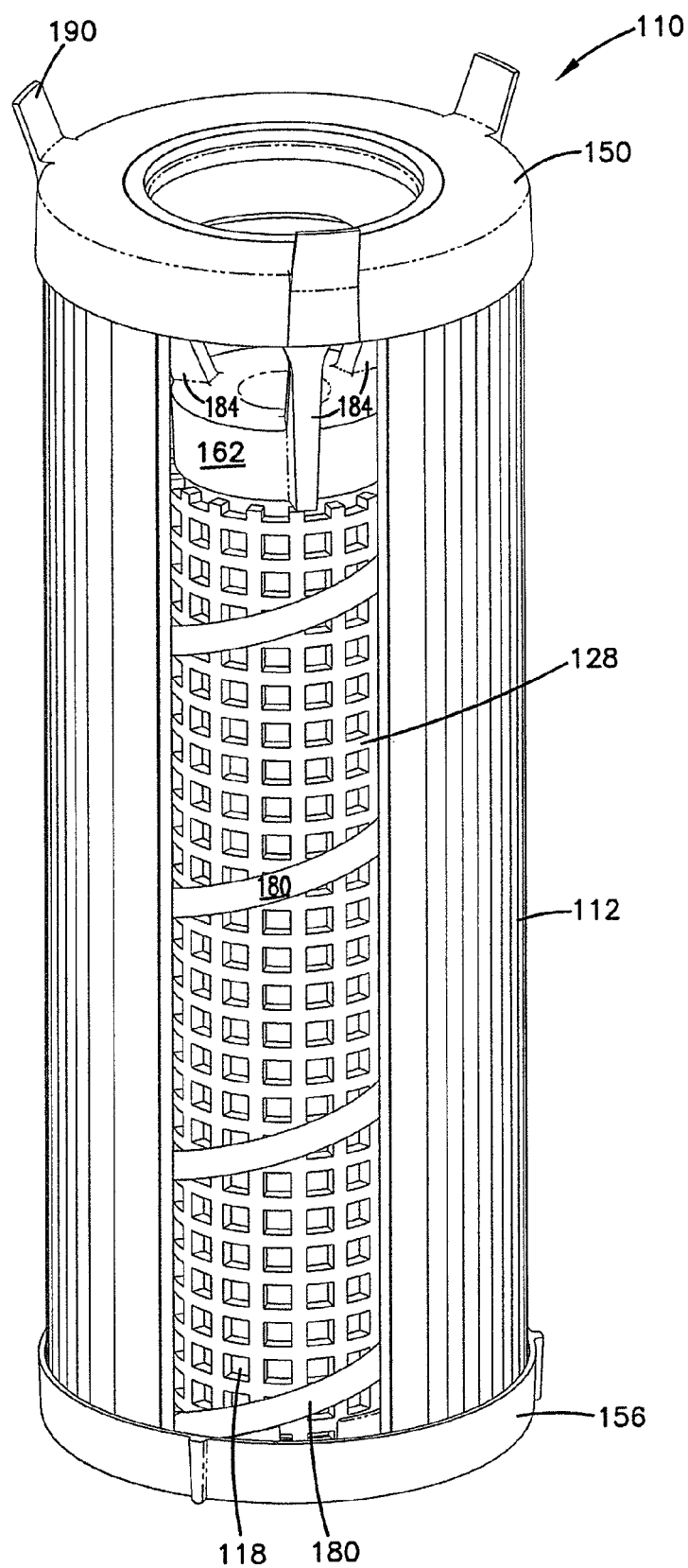
FIG. 8 is a schematic, perspective view of the filter element depicted in FIG. 7, with a portion broken away to illustrate interior components.

FIG. 8 illustrates another perspective view of the filter element 110, with portions broken away to further clarify features. In FIG. 8, the gussets 184 can be seen projecting from the third end cap 162. The spring 180 is also viewable. The outer liner 128 of the second inner filter media construction 118 can also be seen.

Methods of filtering and constructing a filter element for the embodiment of FIG. 6 are analogous to the descriptions above with respect to FIG. 1, and are incorporated herein by reference.

The above description represents examples. Many embodiments constructed according to principles of this disclosure can be made.

We claim:

1. A method of filtering comprising:
   (a) directing unfiltered fluid through a first tubular construction of media and into a filtered fluid volume;
   (b) directing unfiltered fluid through a second tubular construction of media and into the filtered fluid volume; the second tubular construction of media being circumscribed by and radially spaced from the first tubular construction of media;
   (c) supporting the first tubular construction of media and the second tubular construction of media with a non-metallic brace arrangement radially between the first tubular construction of media and the second tubular construction of media; and
   (d) wherein: the step of supporting includes supporting the first tubular construction of media with an inner plastic liner and supporting the second tubular construction of media with an outer plastic liner and radially bracing the inner plastic liner and the outer plastic liner against each other.

2. A method according to claim 1 wherein:
   (a) the step of radially bracing includes using a spring between and against the inner plastic liner and the outer plastic liner.

3. A method according to claim 1 wherein:
   (a) the step of supporting includes supporting the first tubular construction of media with an inner plastic liner and supporting the second tubular construction of media with an outer plastic liner and bracing an end cap on the first tubular construction of media against an end cap on the second tubular construction of media.

4. A method according to claim 1 wherein:
   (a) the step of directing unfiltered fluid through a second tubular construction of media and into the filtered fluid volume includes directing unfiltered fluid through an aperture in an end cap, into an unfiltered fluid channel, through the second tubular construction of media, and into the filtered fluid volume.

5. A method according to claim 1 further comprising:
   (a) directing fluid from the filtered fluid volume through an aperture in an end cap.

6. A method of constructing a filter element; the method comprising:
   (a) selecting a first filter media and forming the first filter media into a first tubular construction having a non-metallic inner liner;
   (b) selecting a second filter media and forming the second filter media into a second tubular construction having a non-metallic outer liner;
   (c) operably orienting the second tubular construction in the first tubular construction and radially spacing the first filter media from the second filter media; and
   (d) providing a non-metallic brace construction radially between the first tubular construction and the second tubular construction.

7. A method according to claim 6 wherein:
   (a) the step of operably orienting includes securing the first tubular construction and the second tubular construction to a single end cap defining an aperture.

* * * * *